US007788032B2

(12) United States Patent
Moloney (10) Patent No.: US 7,788,032 B2
(45) Date of Patent: Aug. 31, 2010

(54) TARGETING LOCATION THROUGH HAPTIC FEEDBACK SIGNALS

(75) Inventor: Dave John Moloney, Dublin (IE)

(73) Assignee: Palm, Inc., Sunnyvale, CA (US)

( * ) Notice: Subject to any disclaimer, the term of this patent is extended or adjusted under 35 U.S.C. 154(b) by 374 days.

(21) Appl. No.: 11/855,879

(22) Filed: Sep. 14, 2007

(65) Prior Publication Data

US 2009/0076723 A1    Mar. 19, 2009

(51) Int. Cl.
*G01C 21/34* (2006.01)
*G01C 21/00* (2006.01)
(52) U.S. Cl. .................. 701/213; 701/201; 701/301; 715/701; 345/156; 340/539.11; 340/539.13; 340/407.1
(58) Field of Classification Search .................. None
See application file for complete search history.

(56) References Cited

U.S. PATENT DOCUMENTS

| 5,807,111 | A | * | 9/1998 | Schrader ..................... 434/112 |
| 6,320,496 | B1 | * | 11/2001 | Sokoler et al. ........... 340/407.1 |
| 6,486,784 | B1 | * | 11/2002 | Beckers ..................... 340/573.1 |
| 2002/0109668 | A1 | * | 8/2002 | Rosenberg et al. .......... 345/156 |
| 2005/0060088 | A1 | * | 3/2005 | Helal et al. ................. 701/208 |
| 2005/0140544 | A1 | * | 6/2005 | Hamel et al. ........... 342/357.08 |
| 2007/0106457 | A1 | * | 5/2007 | Rosenberg ................... 701/200 |
| 2008/0120029 | A1 | * | 5/2008 | Zelek et al. .................. 701/213 |
| 2009/0073112 | A1 | * | 3/2009 | Basson et al. ............... 345/156 |

OTHER PUBLICATIONS

S. Bosman, B. Groenendaal, J.W. Findlater, T. Visser, M. de Graaf and P. Markopoulos, "GentleGuide: An Exploration of Haptic Output for Indoors Pedestrian Guidance", Mobile HCI 2003, pp. 358-262, 2003.*
S. Ertan, C. Lee, A. Willets, H. Tan and A. Pentland, "A Wearaable Haptic Navigation Guidance Sysytem" IEEE 0-8186-9074-7/98, pp. 164-165, 1998.*
C. Lagorio, "Momo Isn't Exactly the New Seeing-Eye Dog, But He Sure is Cute", Daily Intelligence, retrieved from http://nymag.com/daily/intel/2007/12/momo_cant_help_the_bling_but_h.html, Dec. 17, 2007.*

* cited by examiner

*Primary Examiner*—Thomas G Black
*Assistant Examiner*—Lin B Olsen
(74) *Attorney, Agent, or Firm*—Fenwick & West LLP (57) ABSTRACT

A data processing apparatus and a method of operating a data processing apparatus are disclosed. The data processing apparatus comprises a memory for storing target location data representative of the location of a target, a position determining component configured to generate a position signal representative of a position of the data processing apparatus, and an orientation determining component configured to generate an orientation signal representative of an orientation of the data processing apparatus. The data processing apparatus also comprises a haptic transducer configured to provide haptic feedback to a user of the data processing apparatus and a processor configured to process the target location data, position signal and orientation signal in order to generate a transducer control signal that is configured to actuate the haptic transducer to provide directional haptic feedback to a user relative to the target location.

20 Claims, 6 Drawing Sheets

TARGETING LOCATION THROUGH HAPTIC FEEDBACK SIGNALS

BACKGROUND

1. Field of Art

The present disclosure relates to data processing apparatus and a method of operating data processing apparatus, in particular, but not exclusively to hand held data processing apparatus configured to guide a user of the data processing apparatus to a target location through use of haptic feedback signals. Haptic feedback signals can be felt by a user's sense of touch.

2. Description of the Related Art

Global positioning systems (GPS) are known to be used to guide a user to a target location. An example of which is disclosed in US 2006/271286 (Rosenberg) which discloses a method of presenting images to a user of a vehicle navigation system that includes accessing location data indicating a particular location included within a route determined by a vehicle navigation system and accessing corresponding direction data, obtaining a captured image based on the access location and direction data, and displaying the obtained image to the user.

SUMMARY

Viewed from a first aspect, a data processing apparatus comprises a memory for storing target location data representative of the location of a target; a position determining component configured to generate a position signal representative of a position of the data processing apparatus; an orientation determining component configured to generate an orientation signal representative of an orientation of the data processing apparatus; a haptic transducer configured to provide haptic feedback to a user of the data processing apparatus; and a processor. The processor is configured to process the target location data, position signal and orientation signal in order to generate a transducer control signal that is configured to actuate the haptic transducer to provide directional haptic feedback to a user relative to the target location.

Viewed from a second aspect, there is provided a method of operating data processing apparatus comprising: storing target location data representative of the location of a target in memory; generating a position signal representative of a position of the data processing apparatus; generating an orientation signal representative of an orientation of the data processing apparatus; processing the target location data, position signal and orientation signal in order to generate a transducer control signal; and providing directional haptic feedback to a user of the data processing apparatus relative to the target location by actuating a haptic transducer responsive to the transducer control signal.

Providing haptic feedback to the user conveniently allows a user to be guided without detracting from their other senses, such as sight and hearing as the user can be guided to the target location without having to look at, or listen to directional instructions. Some embodiments may enhance safety where it is important that the user is aware of sights and sounds happening around them, for example when driving a vehicle, or walking or cycling along a busy street. Such embodiments may be particularly useful to people who have impaired sight or hearing. Furthermore, the orientation of the data processing apparatus does not detract from or inhibit the operation of the data processing apparatus as the haptic feedback signal is generated as a result of processing performed upon the orientation signal.

The processor may be configured to regenerate the transducer control signal periodically as this can regularly update the user of a desired direction relative to the target location. The transducer control signal may be regenerated in response to user input, and this can save power and allow the user to control how intrusive the data processing apparatus is.

The directional haptic feedback may represent a relative direction from the data processing apparatus to the target location, which may take into account the orientation of the data processing apparatus. The transducer control signal may be configured to actuate the haptic transducer to generate directional haptic feedback towards the target location.

In other embodiments, the transducer control signal may be configured to actuate the haptic transducer to generate directional haptic feedback away from the target location, and in such embodiments can be used to guide a user of the data processing apparatus away from potential hazards such as flooding, a forest fire, or a radiation leak as non-limiting examples.

The haptic transducer may be configured to generate directional haptic feedback in two or three dimensions. The first and second dimensions may represent forwards/backwards and left/right, and the third dimension may indicate changing storey within a building, and/or going up stairs, and/or any other predefined situation, for example a situation that may be considered as a hazard such as crossing a road, an indication of an obstacle or a kerb or incline that may affect decisions on how to proceed.

The processor may further be configured to determine if a current relative direction of motion of the data processing apparatus is towards the target location, and to generate a transducer control signal responsive to that determination. This can allow feedback to be provided to the user if they are going in the wrong direction and/or are getting further away from the target location.

The data processing apparatus may further comprise one or more accelerometers configured to generate acceleration signals representative of the acceleration of the data processing apparatus. The processor may be configured to also process the acceleration signals to determine the distance and direction travelled by the data processing apparatus after a position signal is generated by the position determining component, and to use the determined distance and direction to generate the transducer control signal. This can enable the data processing apparatus to continue to generate haptic feedback when the position determining component does not receive the necessary information, such as signals from satellites when using GPS, to generate a position signal.

The position determining component may be configured to receive signals from a plurality of transmitters, and may include a global positioning system (GPS) receiver. The orientation determining component may be a gravity sensor.

The data processing apparatus may comprise a first and second separate physical device. The position determining component and the memory may be located within the first physical device, and the haptic transducer and the orientation determining component may be located within the second physical device.

The functionality of the processor may be distributed between the first and second device. For example, the processor may comprise a first processing resource on the first device and a second processing resource on the second device. The first processing resource may be configured to process the target location data and the position signal in order to generate an intermediary transducer control signal. The second processing resource may be configured to process the intermediary transducer control signal and the orientation signal to generate the transducer control signal.

The second physical device may comprise a wireless receiver configured to receive a signal, such as the intermediary transducer control signal, from the first device that is configured to actuate the haptic transducer to provide the directional haptic feedback.

There may be provided a computer program comprising machine or computer-readable program elements for configuring a data processing apparatus or to configure a data processing apparatus according to an aspect of this disclosure and/or to implement a method according to an aspect of this disclosure.

There may be provided a carrier medium carrying the computer program, and the carrier medium may be one of the following: solid-state memory; magnetic memory; CD-ROM; digital versatile disk (DVD); read-write CD; an electronic signal; radio frequency carrier wave or optical carrier wave.

The data processing apparatus may be a communications device, for example a wireless/mobile communications device. The wireless communications device may be configured for cellular telephony, such as a mobile telephone. The data processing apparatus may be a computing device, for example a mobile computing device such as a personal digital assistant (PDA), and may be a personal computer (PC) or a laptop. The communications device may be handheld.

The features and uses described in the specification are not all inclusive and, in particular, many additional features and uses will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the detailed description, the appended claims and accompanying drawings, in which:

DETAILED DESCRIPTION

The Figures (FIGS.) and the following description relate to particular embodiments by way of illustration only. It should be noted that from the following discussion, optional embodiments of the structures and methods disclosed herein will be readily recognized as viable options that may be employed without departing from the principles of the claimed subject-matter.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that optional embodiments of the structures and methods illustrated herein may be employed without departing from the principles described herein.

Embodiments of the present disclosure relate to a hand held device that is configured to provide haptic feedback to a user of the device to guide them to a target location. Haptic feedback stimulates a user's sense of touch and may be referred to as force feedback or tactile feedback. The haptic feedback may be configured to vibrate in a certain direction in order to "nudge" the user towards the target location, or may be configured to provide one or more different predefined haptic signals indicative of a specific situation, for example the user of the hand held device going in the wrong direction for a predefined period of time, or straying from a route, for example by getting further away from the target location. Examples of predefined haptic signals can include a variation in the intensity of the haptic feedback, a pattern of haptic feedback signals, such as "on, off, on, off" and/or directional haptic feedback. Only providing haptic feedback upon the occurrence of specific situations may be more efficient, and use less than power, than providing haptic feedback periodically even when the user is following the route successfully. In this way, the haptic feedback can be less intrusive to the user.

Figure 1:
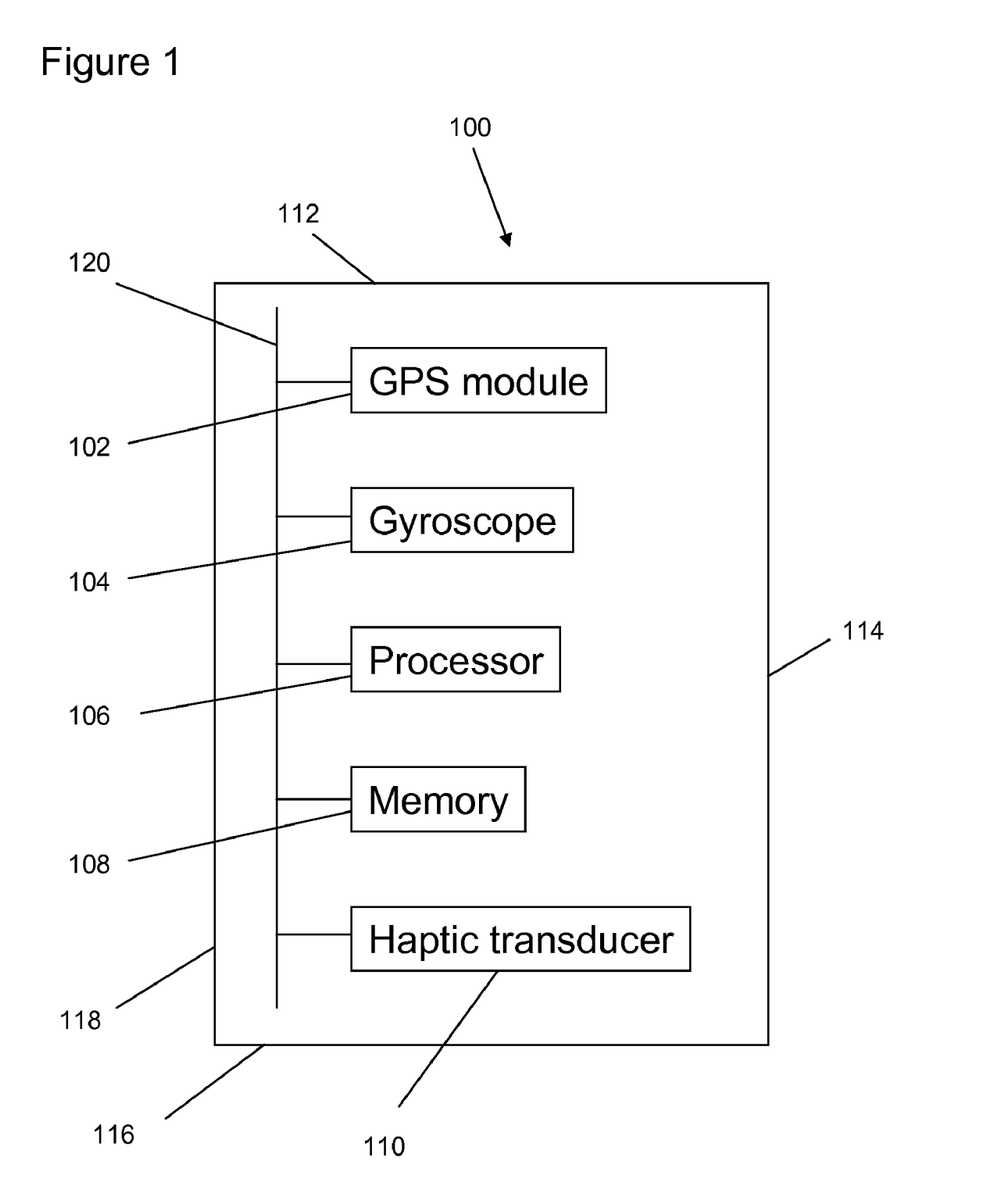
FIG. 1 illustrates an embodiment of a data processing apparatus.

FIG. 1 illustrates an embodiment of a data processing apparatus 100. The data processing apparatus of this embodiment is a hand held device 100, and comprises a GPS module (position determining component) 102, a gyroscope (orientation determining component) 104, a processor 106, memory 108, and a haptic transducer 110, all of which are connected to a data bus 120.

The data processing apparatus 100 is housed within a housing which has a front surface 112, a right surface 114, a left surface 118 and a back surface 116 relative to an orientation of operation of the data processing apparatus.

The position determining component in this embodiment is a global positioning system (GPS) module 102 that is configured to generate a position signal representative of the latitude and longitude of the location of the hand held device 100 and in some embodiments can also determine an absolute direction in which the hand held device 100 is pointing, that is north/south/east/west.

The orientation determining component in this embodiment is a gyroscope 104 that is configured to determine the orientation of the hand held device 100 relative to the earth's surface. That is, the orientation determining component is configured to generate an orientation signal representative of whether the hand held device is face up, upside down, or tilted in any direction. In some embodiments, the orientation determining component can be considered as a gravity sensor.

Memory 108 is configured to store the latitude and longitude of the target location. The target location may be a destination that the user of the hand held device 100 has provided as an input to the hand held device 100, or may be an intermediate point on the way to that destination, for example a junction in the road where the user of the hand held device 100 has to change direction. In other embodiments, the target location may be one of a plurality of way markers located around a tourist attraction such as the Forbidden City in Beijing, China.

In some embodiments, the data processing apparatus may also comprise a user interface that is configured to receive user input indicative of a target location. In other embodiments, data representative of the target location may be pre-stored in memory 108.

A relative direction to the target location is determined using the position signal and orientation signal, and may be straight ahead, for example in the direction that the front surface 112 of the hand held device 100 is pointing, or in the direction that the right-hand surface 114 of the hand held device 100 is facing, or a combination of the two, that is diagonally forward to the right.

Following this determination, the processor 106 is configured to generate a transducer control signal that is configured to actuate the haptic transducer 110 to cause directional haptic feedback to the user of the hand held device 100 in the determined relative direction to the target location. The haptic transducer 110 may be configured to generate a tactile output signal that feels like a "nudge" to the user of the hand held device 100 in the relative direction to the target location.

In this embodiment, the processor 106 is configured to periodically compare the position signal generated by the GPS module 102 with the target location stored in memory 108 to determine an updated absolute direction from the hand held device 100 to the target location. The processor 106 uses the updated absolute direction and an updated orientation signal to regenerate the transducer control signal periodically, thereby regularly actuating the haptic transducer 110 with up-to-date/refreshed information.

In this embodiment, the gyroscope 106 is configured to provide an orientation signal that represents whether the hand held device 100 is the right way up, or upside down. The processor 106 is configured to use this information to determine in which of two dimensions (forwards/backwards, and left/right) the haptic transducer 110 should be activated. In other embodiments, the gyroscope 104 may be configured to generate an orientation signal that is representative of the degree to which the hand held device 100 is tilted in all three dimensions. In such embodiments, the processor 106 is configured to activate the haptic transducer in three dimensions: that is a combination of up/down, forwards/backwards, and left/right.

In this embodiment, the hand held device 100 is a mobile phone or a personal digital assistant (PDA), although in other embodiments the data processing apparatus may be any other hand held data processing apparatus, including a bespoke hand held device.

In other embodiments, the data processing apparatus 100 may be configured to provide haptic feedback to a user to lead them in any direction relative to the target location, including away from a target location. Such embodiments may be used to guide a user of the data processing apparatus away from a dangerous area such as a flooded area, a forest fire, and an area exposed to a radiation leak for example.

Figure 2:
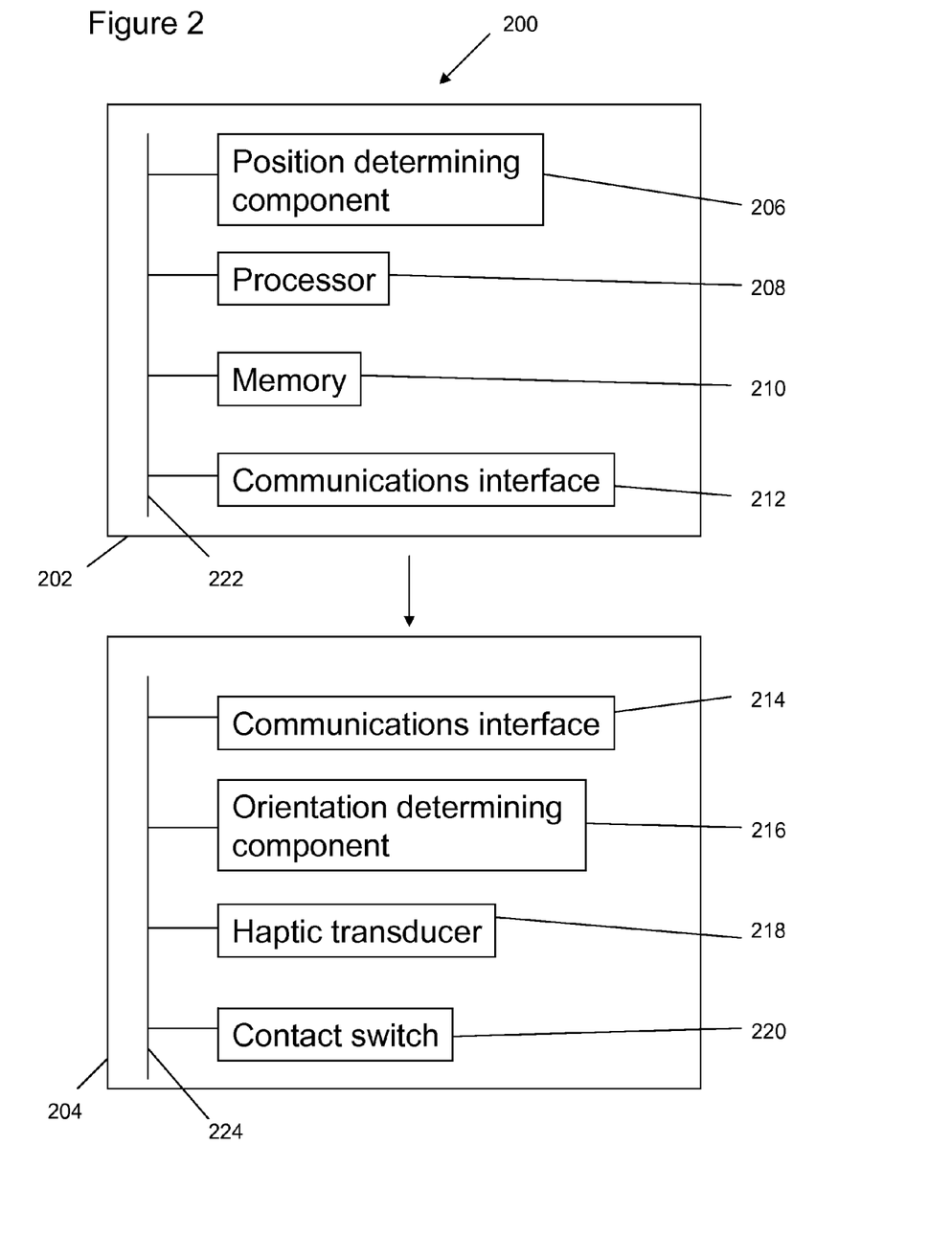
FIG. 2 illustrates another embodiment of a data processing apparatus.

FIG. 2 illustrates another embodiment of a data processing apparatus 200. In this embodiment, the data processing apparatus 200 comprises two separate devices: a first device which is a position determining device 202; and a second device which is a haptic feedback device 204.

In one example, the position determining device 202 may be provided as functionality on a mobile telephone that can sit in a user's pocket whilst in use for example, and the haptic feedback device 204 may be a separate device that the user holds in their hand to receive the haptic feedback signals indicative of the direction towards a target location as they walk around. The haptic feedback device 204 may be ball shaped, or egg shaped, or any other shape that fits conveniently into a user's hand. An egg shaped haptic feedback device may not require a gravity sensor as the egg is likely to be always be held with its point facing upwards.

The position determining device 202 comprises a position determining component 206 such as the GPS module 102 described in FIG. 1, a processor 208 and memory 210. In addition, the position determining device 212 comprises a communications interface 212 that is configured to transmit data to the haptic feedback device 204. The position determining component 206, processor 208, memory 210 and communications interface 212 are all connected to a data bus 222.

The haptic feedback device 204 comprises a corresponding communications interface 214 configured to receive data from the position determining device 202. In particular, the communications interface 214 of the haptic feedback device 204 is configured to receive a signal representative of the absolute direction from the position determining device 202 to the target location. In this embodiment, the distance between the position determining device 202 and the haptic feedback device 204, and the associated discrepancy between the location of the device 202 that determines the position and the device 204 that provides the feedback, can be considered insignificant.

In this embodiment, the communications interfaces 212, 214 are configured to communicate with each other using a wireless personal area network (PAN) protocol such as Bluetooth. Using a short-range communications protocol can ensure that the distance between the position determining device 202 and the haptic feedback device 204 does not get too large such that it causes misleading haptic feedback signals to be generated.

In this embodiment, the processor 208 of the position determining device 202 is configured to compare a position signal generated by the position determining component 202 and the coordinates of a target location stored in memory 210 to generate a signal representative of the absolute direction to the target location based on that comparison. The communications interface 212 of the position determining device 202 is configured to transmit the signal representative of the absolute direction to the target location to the haptic feedback device 204.

Correspondingly, the communications interface 214 of the haptic feedback device 204 is configured to receive the absolute direction signal from the position determining device 202, and translate the absolute direction signal into a relative direction signal using an orientation signal generated by the orientation determining component 216. In this embodiment, the orientation signal provides an indication of the direction in which the haptic feedback device 204 is pointed in addition to an angle that the haptic feedback device 204 is tilted. In this embodiment, the orientation determining component comprises a navigational compass and a gravity sensor.

The haptic feedback device 204 is configured to provide a transducer control signal that is a representation of the relative direction to the target location to the haptic transducer 218 to cause the haptic transducer to vibrate, or otherwise stimulate the user's sense of touch, in a fashion that is determinable by the user as pushing/nudging the user in the relative direction towards the target location.

In this embodiment, the haptic feedback device 204 also comprises a contact switch 220, such as a capacitive switch, which is configured to determine whether or not the haptic feedback device 204 is being held by a user. If a signal generated by the contact switch 220 represents that the haptic feedback device 204 is not being held by a user, the haptic transducer and/or the haptic feedback device 204 in general can be disabled whilst the device 204 is not being held. This can save power, which may be limited in a hand held device.

Situations where embodiments of the data processing apparatus might be used may include a route finder to a location identified by the user of the data processing apparatus, for example by inputting a postcode/zip code of a target location with a user interface module associated with the data processing apparatus; to guide a user through an area of interest, such as a museum or a park via points of interest; guiding a tourist through a city as part of a walking city guide; and guiding a blind person or visually impaired person in a silent fashion along predetermined paths, such as through a park. In some embodiments, transducer control signals can cause the haptic transducer to vibrate so as to identify steps or other hazards to the user.

In some embodiments, it may be possible to download predefined routes from the internet for example, that can be stored locally in a memory associated with the data processing apparatus. As an example, a user may be able to select one of a plurality of routes associated with a city dependent upon their interests. The user can then use the data processing apparatus to follow that selected route as described above. Examples of different types of route can include historical, entertainment such as theatres in the West End of London, and a tour of eating and drinking establishments. In some embodiments, the data processing apparatus may be configured to display images, or play audio files, associated with the route to the user at locations on the route.

In some embodiments, the haptic feedback device may be a headset for a mobile telephone, such as a Bluetooth headset, where the headset is also a guide device. The headset can be configured to provide directional impulses to the user as the haptic feedback and also be configured to support telephony functionality using audio transducers. In some embodiments the headset may also support Advanced Audio Distribution Profile (A2DP) functionality or a similar protocol to provide spoken directions to complement the directional impulses.

In other embodiments, the first and second devices may be in wired communication, and as an example the wires may be fastened to an item of clothing such as a jacket. The item of clothing may have a channel suitable for accommodating the wires, for example underneath a Velcro flap.

Figure 3:
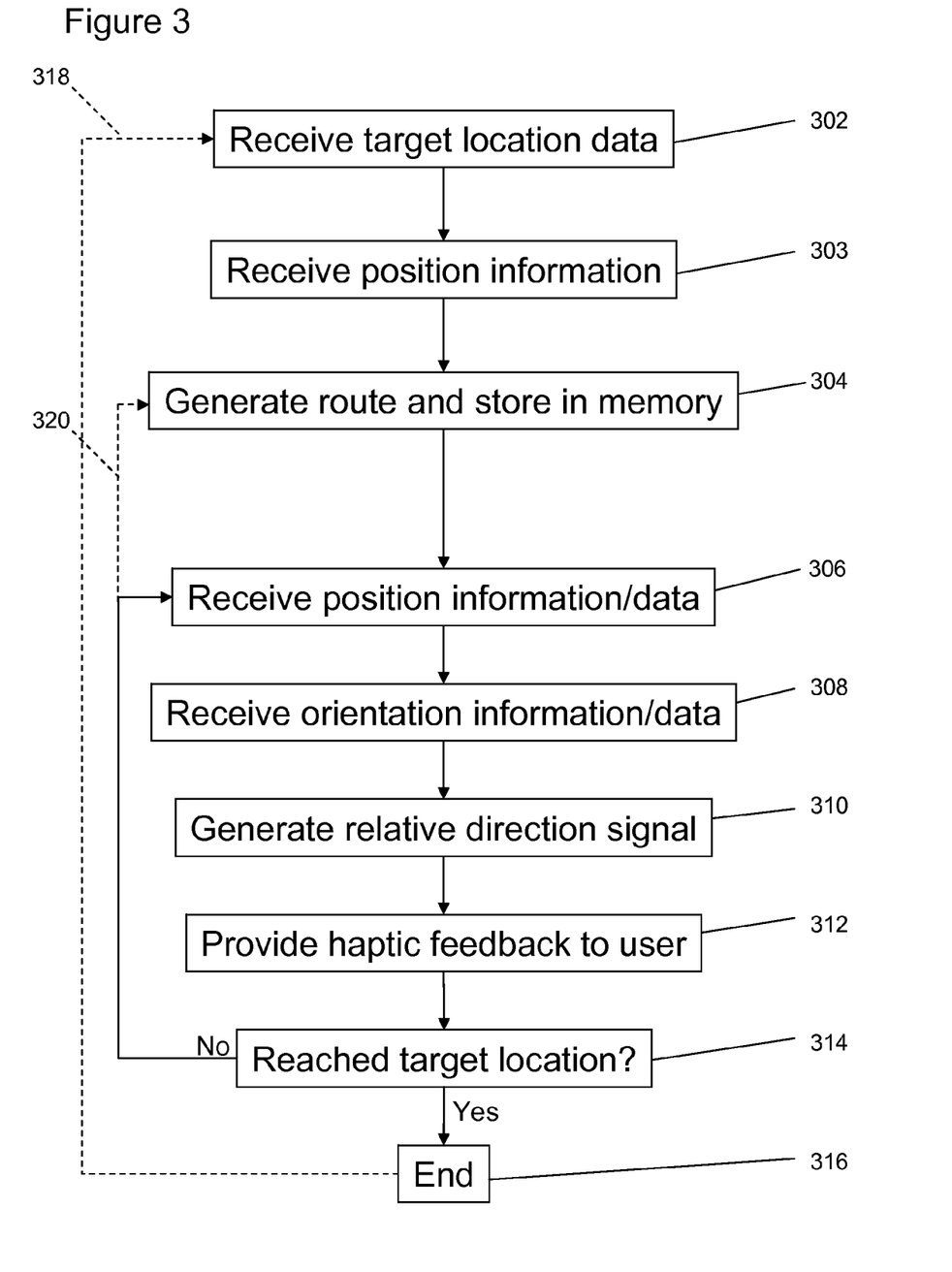
FIG. 3 illustrates a process flow diagram showing an embodiment of steps performed for operation of a data processing apparatus.

FIG. 3 illustrates a process flow control diagram showing an embodiment of steps performed for operation of a data processing apparatus.

At step 302, the process flow receives target location data. The target location data may be pre-stored in local memory, or calculated in response to user input. Optionally, the target location data may be received from an external device, such as a computer over a network such as the internet. The target location data may be coordinates, such as latitude and longitude that can uniquely identify the location. In other embodiments, the location data may be coordinates relative to one or more beacons that are configured to transmit location information signals, for example as may be present in a museum or other tourist attraction.

Information representative of the present position is received at step 303, and at step 304 an absolute route from the present location of the data processing apparatus to the target location is generated and stored in memory. The absolute route may be an angular direction relative to a fixed axis, for example an angle of 90° clockwise from magnetic north represents east. The route may be a straight line between the present location and the target location, or may take into account a road map or building plan, for example, if it is not physically possible for the user of the data processing apparatus to travel in a straight line to the target location. In such embodiments, intermediary target locations can be identified along the route. In further embodiments still, the route that is generated and stored in memory may take into account one or more check points/way markers as part of a sightseeing tour, for example. In embodiments where the data processing apparatus is used to guide a user on a sightseeing tour, a route of sequential target locations may be pre-stored in memory.

At step 306, the data processing apparatus receives updated position information relating to the present location/position of the data processing apparatus. The position information should be in the same format as the target location data.

Orientation information is received by the data processing apparatus at step 308, and can represent the orientation of the data processing apparatus relative to magnetic north, and/or relative to the Earth's surface for example.

At step 310, a relative direction signal is generated that is representative of the direction from the data processing apparatus to the target location along the route that has been generated and stored at step 304 taking into account the relative orientation of the data processing apparatus. The relative directional signal may represent a direction in two or three dimensions. Haptic feedback is then provided to the user at step 312 in the relative direction (for example forwards) that has been generated at step 310. The relative direction signal is an embodiment of a transducer control signal.

In a two-dimensional example, the absolute route that is determined at step 304 is mapped against the orientation of the data processing apparatus as determined at step 308. As an example, if the absolute route to the target location is northwest and the orientation of the apparatus is that the front of the apparatus is pointing southwest, the relative direction signal that is generated at step 310 is representative of an absolute direction to the target location to the right of the data processing apparatus in its current orientation.

At step 314, the process flow determines whether or not the target location has been reached by comparing the present location of the data processing apparatus with the target location. If the process flow determines that the target location has been reached, the process flow ends at step 316, or the next target location on a route may be received and the process flow returns to step 302 for the new target location as illustrated by dashed arrow 318 in FIG. 3.

In embodiments where the data processing apparatus is used to guide a user around a points of interest tour, such as a historical city tour, the process flow may be configured to guide the user to the next target location (such as the next historical building of interest) when a user provides an indication that they have reached the previous target location. That is, a user provides an input to the data processing apparatus at step 314 to indicate that they wish to move on to the next historical building and the process flow returns to step 302 via arrow 318 to receive the next target location data. Such embodiments can be considered as a series of serial guidances to a plurality of target locations or a connected series of guidances.

In some embodiments, the process flow may be configured to return to step 304 to generate the route to the target location when it is determined at step 314 that the target location has not been reached. This is shown as dashed arrow 320 in FIG. 3. This can enable a revised route to be generated based upon the users present location, and this can be useful, for example if a user has taken a wrong turn and the originally determined route is no longer the best route to the target location.

In some embodiments, ending at step 316 can involve providing haptic feedback to the user that can be different to the haptic feedback that is used to guide the user along the route. For example, the haptic feedback signal that is provided to the user once the target location has been reached can comprise a non-directional signal that can be differentiated from the haptic feedback that is provided to the user at step 312. In some embodiments, a message indicating that the target location has been reached may be provided to the user on a visual display associated with the data processing apparatus, or may be provided as an audio signal to the user.

If the process flow determines at step 314 that the target location has not been reached, the process flow returns to step 306 to receive updated position and orientation information in order to generate an updated relative direction signal. In this embodiment, steps 306 to 314 are performed periodically, for example of the order of once every second, once every two, five, or ten seconds, in order to make efficient use of a limited power supply that may be provided with the hand held device. Periodic operation can also avoid the user becoming irritated by the data processing apparatus continuously vibrating.

In other embodiments, haptic feedback at step 312 may be performed when the user of the data processing apparatus strays from the generated route. This may be in addition to, or instead of, the haptic feedback that is provided periodically. In further embodiments still, haptic feedback at step 312 may be performed when a change of direction is required. In some embodiments, haptic feedback at step 312 (and optionally the associated steps 306 to 314) may only be provided to the user when they select an option indicative that they desire guidance, for example by pressing a button on a user interface.

In some embodiments, it may not be possible for the data processing apparatus to receive position information signals all of the time, for example if a GPS module is taken indoors, or otherwise temporarily obscured from the satellites from which it receives signals. In such embodiments, the position determining component may be configured to determine the location of the data processing apparatus by other components.

For example, in some embodiments the data processing apparatus may comprise one or more accelerometers that can be used to determine the speed and direction of motion of the data processing apparatus. In such embodiments, the data processing apparatus can integrate the speed that the apparatus has traveled in two dimensions (and in some embodiments, three dimensions) since the last time a GPS signal was received to determine the distance that the apparatus has traveled relative to the location determined from the last received GPS signal.

An absolute location of the apparatus can then be calculated by adding the relative distances traveled to the absolute location of the apparatus when the last GPS signal was received.

An example of how a user may use a data processing apparatus that comprises two separate physical devices such as the embodiment illustrated in FIG. 2 will now be described. In this example the two devices are a GPS computer (first device) and a "guiding egg" (that is a second device in the shape of an egg that is configured to provide the user with the haptic feedback to guide the user).

A user arrives at a location in a city and turns on the GPS computer and the guiding 'egg'. Turning the devices on may be a single process or may be two separate processes. The user selects to be guided to a pre-set point of interest in the city using a user interface associated with the GPS computer. The GPS computer then calculates a mapping from 'here to there', that is from the present location determined from the GPS (here) to the selected pre-set point of interest (there).

The user then selects to be guided to the location by haptic feedback as opposed to just following visual directions using a user interface associated with the GPS computer. The visual directions may still be visible to the user on a display of the GPS computer as the user may still want to see street names or an alternate route to the point of interest. The user may be able to select the type of route that they wish to follow to the point of interest, for example, "mostly quiet roads" or 'mostly pedestrian routes'.

The user then holds the "guiding egg" in their hand and sets off in the direction of a haptic impulse received from the "guiding egg". There may be a safety warning when the user invokes the "guiding egg" feature as the user may be in the middle of a roadway when they start receiving the haptic impulses.

The user can move their hand holding the "guiding egg" in any direction that they wish and the "guiding egg" is configured to take its relative orientation into account to ensure that the generated haptic impulses lead the user in the direction of a first vector along the route to the point of interest irrespective of the orientation of the "guiding egg".

When the user reaches a turning point, they may be forewarned that a turning point or junction/crossing point is coming up by receiving haptic and/or audio and/or visual feedback to that effect. At a turning point or other junction, the "guiding egg" may gesture that the turn is to the left or right, or if the user is going in the wrong direction, the "guiding egg" can provide feedback to indicate to the user to go back in the direction that they came from. A new vector along a next leg of the route may be generated by the "guiding egg" once the user reaches the turning point. The user can then follow the haptic feedback in the direction of the new vector until the next turning point, or until a stopping point. A stopping point may be a set of traffic lights or a crossing in the road, or any other location where the user should stop moving.

The concept of a stopping point may be particularly appropriate when the data processing apparatus is being used by a pedestrian. A GPS may not include identifiers of traffic lights and road crossings for example, and stopping points may be used to supplement the data provided by the position determining to fill in any gaps in the received position data.

In embodiments where the "guiding egg" (haptic feedback device) uses position information derived from a GPS, the information provided by the GPS may be capable of linking a user's position with a known pathway/route such as a road, and possibly a direction a travel along that pathway. The GPS may have access to coordinates of boundaries that define known pathways and is configured to assume that if a present location of the user is within those boundaries that they are on that pathway. A processor associated with the data processing apparatus can use the identification of the known pathway that the user is on to determine in which direction to provide the directional feedback. The GPS, or other position determining component, may be capable of linking the position of the user to a pedestrian pathway.

Figure 4:
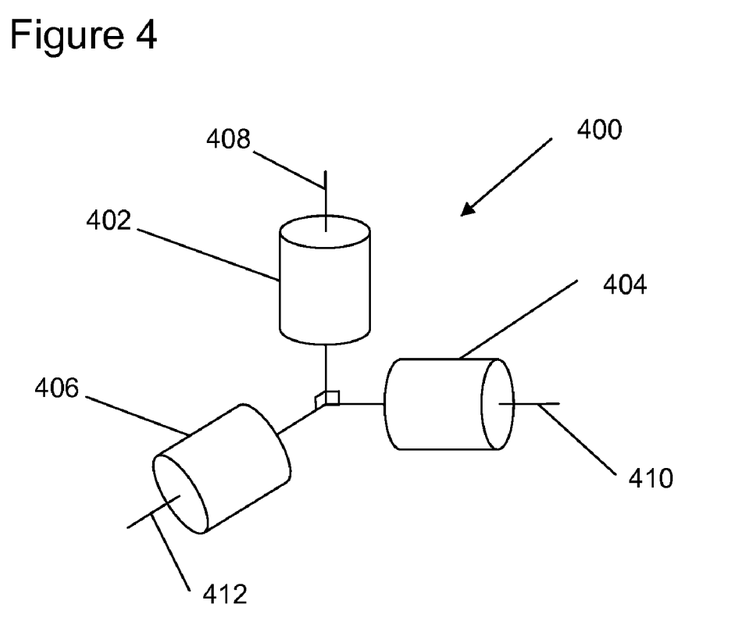
FIG. 4 illustrates an embodiment of a haptic transducer.

FIG. 4 illustrates an embodiment of a haptic feedback device/transducer 400 comprising three motors 402, 404, 406. The three motors 402, 404, 406 are mounted on axes 408, 410, 412 that are perpendicular to each other. In Cartesian coordinates, and as illustrated in FIG. 4, axis 408 represents the z axis, axis 410 represents the x axis, and axis 412 represents the y axis.

Each motor 402, 404, 406 has an unbalanced mass on its drive shaft in order to generate vibrations when the motor is activated. Each of the motors 402, 404, 406 can be activated in either a forward or reverse direction in order to generate an overall directional vibration of the haptic feedback device 400 that is controllable in three dimensions. In some embodiments, the relative speed that the motors 402, 404, 406 are activated can control the degree to which the haptic feedback device vibrates in the direction associated with that motor 402, 404, 406. In other embodiments, one or more of the motors 402, 404, 406 may be activated intermittently to provide a required degree of vibration in an appropriate direction.

Figure 5:
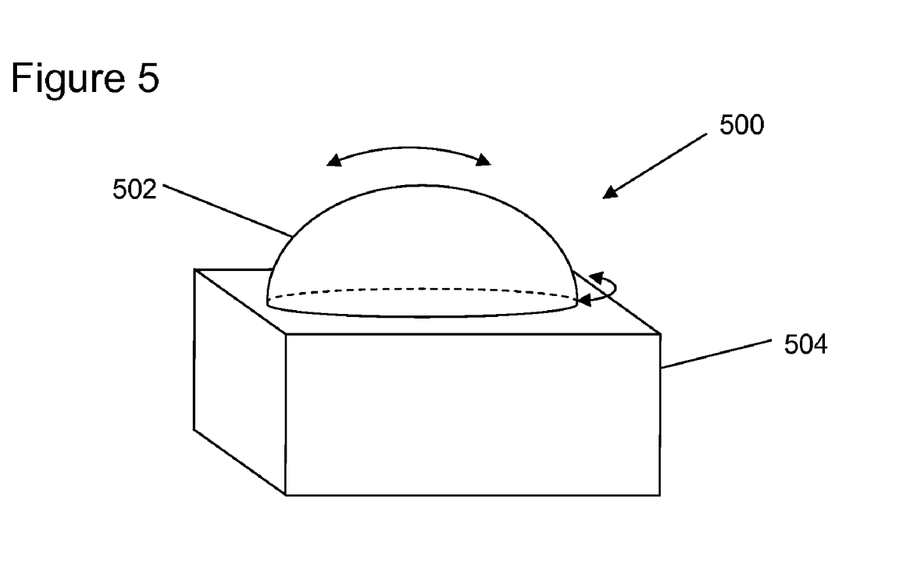
FIG. 5 illustrates another embodiment of a haptic transducer.

FIG. 5 illustrates another embodiment of a haptic feedback device 500. In this embodiment, the haptic feedback device 500 includes a rotatable ball 502 mounted within a housing 504. A plurality of rollers (not shown) are configured to contact the ball 502 within the housing 504 in order to rotate the ball when activated. The rollers may be configured in the same way as is known with trackballs and mouse balls. The rollers are controlled by electronic circuitry to cause the ball 502 to rotate forwards/backwards, and/or to the left/right in accordance with the determined relative direction to the target location. In use, a user can place their finger on the ball 502 in order to feel which direction the ball is rotating as an indication of the direction towards the target location.

Figure 6A:
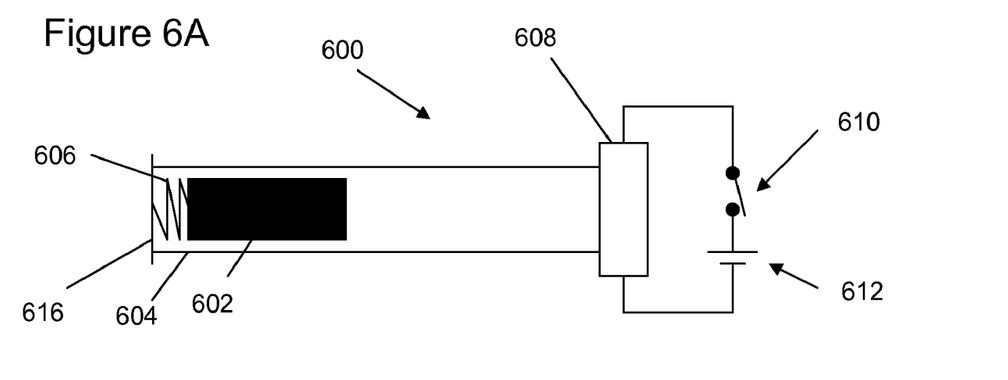
FIGS. 6A, 6B and 6C illustrate another embodiment of a haptic transducer.
Figure 6B:
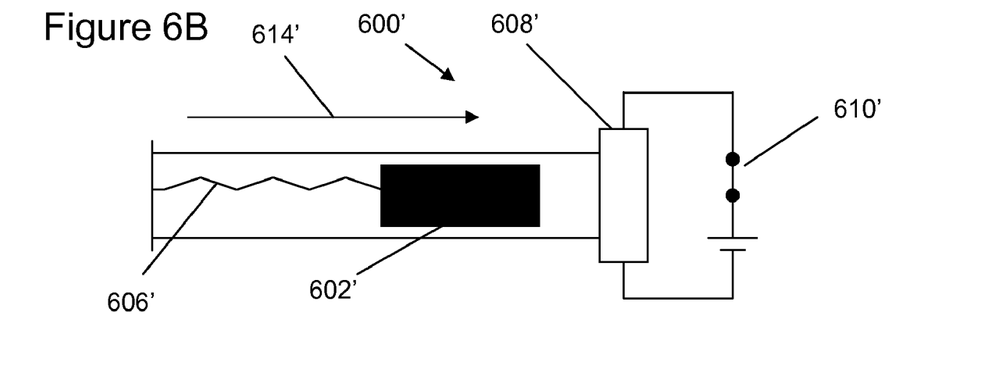
Figure 6C:
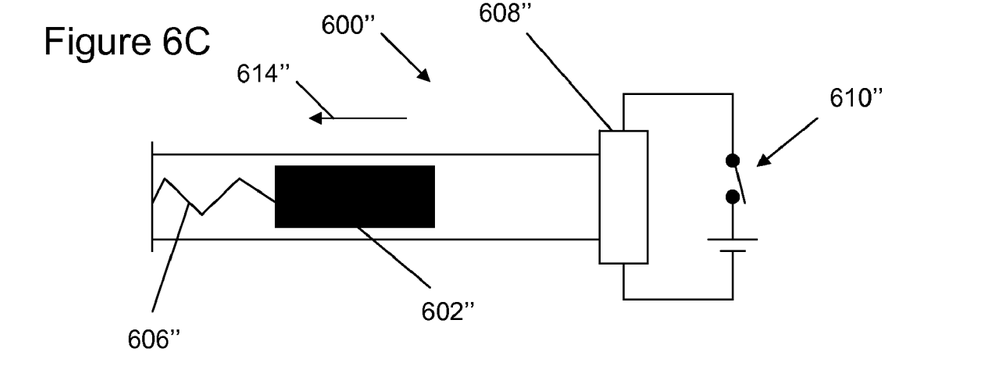

FIG. 6 illustrates a further still embodiment of a component of a haptic feedback device 600. Only a single component of the haptic feedback device 600 is illustrated in FIG. 6 in order to aid clarity, and it will be appreciated that one or more further haptic feedback devices 600 can be provided mounted in different dimensions in order to provide directional haptic feedback in those dimensions. The haptic feedback device illustrated in FIG. 6 can be considered as a linear impulse motor.

The haptic feedback device 600 comprises a metal weight 602 attached by a spring to a base plate 616 at a proximal end of a longitudinal chute 604. The metal weight 602 can travel in a longitudinal direction along the chute 604. The metal weight 602 may be a metal bar or a metal ball.

At the distal end of the longitudinal chute 604 is an electromagnet 608 that forms part of a circuit with a switch 610 and a power supply 612. It will be appreciated that a simplified circuit is illustrated in order to aid clarity, and that the switch 610 is not necessarily a mechanical switch. The switch 610 can be activated in response to the relative direction signal when the haptic feedback device 600 is actuated.

When the switch 610 is activated, power is supplied to the electromagnet 608, and the metal weight 602 is drawn towards the electromagnet 608. This is shown in FIG. 6B.

In FIG. 6B, the metal weight 602' has been drawn towards the electromagnet 608' against the force of the spring 606'. The force exerted on the metal weight is illustrated by arrow 614'.

As illustrated in FIG. 6C, the switch 610" has subsequently been reopened, and therefore the electromagnet 608" has been switched off. In the absence of the force generated by the electromagnet 608", the metal weight 602" returns to its starting position illustrated in FIG. 6A under the influence of the spring 606". The strength of the spring is selected such that it returns the metal weight 602 with a force as illustrated by arrow 614" in FIG. 6C.

In one example, the strength of the force exerted by the spring 606 slowly returns the metal weight 602 to its starting position. The force 614" to return the metal weight 602" that is exerted by the spring 606 is considerably less than the force 614' that is exerted on the metal weight 602' when the electromagnet 608 is activated. This ensures that there is an uneven set of opposite forces when the metal weight 602 moves back and forth down the chute 604 such that over time the haptic feedback device 600 can generate an overall directional force in the longitudinal direction of the chute 604.

In other examples, the electromagnet 608 can be activated with at least two different voltages such that the force 614' that is exerted by the activation of the electromagnet 608 can be less than, or greater than, the force 614" exerted by the spring 606. This ensures that the overall directional force generated by the haptic feedback device 600 over time can be controlled in both directions of the longitudinal chute 604.

In other embodiments a reverse electromagnetic force could be used instead of the spring 606 to return the metal weight 602 to its starting position.

In embodiments configured to provide three-dimensional haptic feedback, the haptic transducer comprises three haptic devices 600 illustrated in FIG. 6 arranged in three mutually perpendicular directions such as axes 408, 410, 412 illustrated in FIG. 4. In such embodiments, a circuit controlling the firing/actuation of the haptic devices 600, coordinates whether one or two or all three electromagnets are engaged at a given moment. The same circuit has access to a gravity sensor which is configured to generate a signal indicative of which way is down relative to the housing of the data processing apparatus at any given moment. This dynamically changes the direction of the impulses being generated by the electromagnets to correct for rotation/tilting of the data processing apparatus. The directional impulses can be generated by firing one or more electromagnets periodically.

In some embodiments, the haptic transducer, or another haptic transducer can be configured to provide feedback to a user indicative of a change of direction that will be required to stay on the route. For example, turn left in 100 meters. Such feedback may be discernible by the user from the directional feedback that is provided to "nudge" the user in a desired direction.

Figure 7:
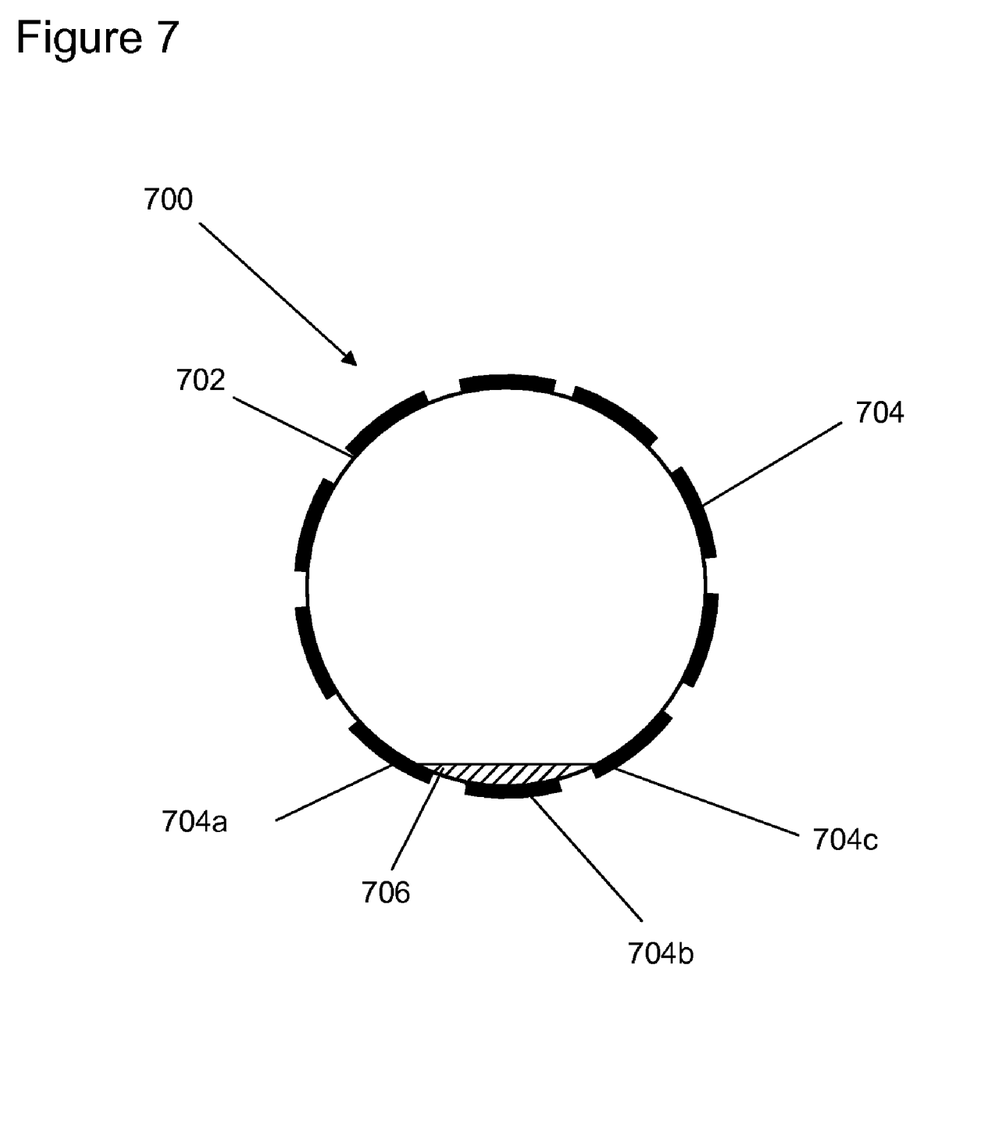
FIG. 7 illustrates an embodiment of an orientation sensor.

FIG. 7 illustrates a cross-sectional view of a gravity sensor 700 that is an embodiment of an orientation determining component. The gravity sensor 700 comprises a spherical shell 702 which has a plurality of electrical contacts/sensors 704 equi-angularly spaced around the surface of the spherical shell 702. Located within the shell is a volume of mercury 706 which is liquid at room temperature. It will be appreciated that any other electrical conductor could be used instead of the mercury 706, including water and metal ball bearings.

At least a portion of a surface of each of the contacts 704 is exposed to the inside of the shell 702 such that the combination of the shell 702 and the exposed surfaces of the contacts 704 form an enclosure that retains the mercury (or other conductor) within the shell 702.

The gravity sensor 700 is located within a data processing apparatus such that its orientation relative to the data processing apparatus is fixed.

As the orientation of the data processing apparatus changes, the volume of mercury 706 flows to the bottom of the shell 702 under the force of gravity, thereby electrically connecting the contacts 704 that are lowermost in the shell 702. In the example illustrated in FIG. 7 electrical contacts 704a, 704b, 704c are electrically connected by the mercury 706.

Each of the electrical sensors/contacts 704 is connected to a processor (not shown) which is configured to process the outputs of each of the electrical contacts 704 to determine which contacts 704 are electrically connected by the mercury 706 thereby providing an indication of which side of the gravity sensor 700 is lowermost. Determining which side of the gravity sensor 700 is lowermost provides an indication of the three-dimensional orientation of the gravity sensor 700, and therefore the three-dimensional orientation of the corresponding data process apparatus.

The determined three-dimensional orientation of the data processing apparatus can be used to determine which of the haptic transducers associated with the orientation device to actuate in order to provide a user with the desired directional haptic feedback.

In some embodiments, a gravity-sensing element of the orientation determining component may not be required as the data processing apparatus may be configured to self-orient itself with regard to gravity. The orientation determining component may still require a directional component such as a compass.

An embodiment of an orientation determining component that does not require a gravity sensor comprises two concentric spheres, wherein the inner sphere can freely rotate relative to the outer sphere, and the outer sphere is fixed relative to the data processing apparatus. The haptic transducers are fixed to the inner sphere such that they can also freely rotate relative to the outer sphere.

The inner sphere has a counter weight attached to it such that the inner sphere automatically orients itself with the counter weight at the bottom under the force of gravity. In this way the inner sphere, and hence the haptic transducers, have a fixed relationship with the Earth's surface and a gravity sensor is not required.

In some embodiments, the haptic feedback can be accompanied by visual or audio feedback, and the haptic feedback may comprise vibrations and/or stimulating the user's sense of touch with heat or coldness. The feedback, including the audio and/or haptic feedback, can provide positive and/or negative feedback to a user. For example, an indication that the user is correctly or incorrectly following a path/route. As an example, a haptic feedback pulse at a frequency of 0.25 Hz might indicate that the user is on the right track, whereas a pulse with a frequency of 2 Hz might indicate that the user is not on the right track. The negative feedback indicative of the user going wrong (that is, not being on the right track) may be perceived as more urgent by the user due to the higher frequency feedback. A further still feedback signal might indicate that the data processing apparatus is calculating a new route, and this can be interpreted by the user as a "please wait" signal until the new route has been calculated.

An extension of the data processing apparatus may be configured to receive an input signal from accelerometers associated with the data processing apparatus representative of how the user is moving the data processing apparatus. For example, signals received from the accelerometers indicative of the apparatus being rapidly shaken from side-to-side may cause the data processing apparatus to switch itself off, or put itself into a standby mode in order to save power.

Haptic feedback may be provided to the user of the data processing apparatus if the battery is low, or if the apparatus is going out of range of GPS or of the remote GPS, for example.

Insofar as embodiments described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identify module, tape, cassette solid-state memory. The computer program may be supplied from a remote source embodied in the communications medium such as an electronic signal, radio frequency carrier wave or optical carrier waves. Such carrier media are also envisaged as aspects of the present invention.

It will be appreciated that one or more elements of any of the components described herein, including the position determining component and the orientation determining component, may be distributed over one or more software, hardware and firmware elements.

By way of example as it relates to the descriptions above of software controlled devices, there configuration as carrier signals and storability as instructions on a computer readable medium, in one embodiment system can be configured so that a computer readable storage medium stores instructions executable by a processor. The instructions when executed by the processor cause the processor to store target location data representative of the location of a target in memory, generate a position signal representative of a position of the data processing apparatus, generate an orientation signal representative of an orientation of the data processing apparatus, process the target location data, position signal and orientation signal in order to generate a transducer control signal, and provide directional haptic feedback to a user of the data processing apparatus relative to the target location by actuating a haptic transducer responsive to the transducer control signal. Moreover, the computer program as embodied through these instructions may also be embodies through a carrier medium or electronic carrier wave signal.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for data processing system and process to a target location through use of haptic feedback signals through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope of those as defined in the appended claims.

What is claimed is:

1. A data processing apparatus comprising:
    a memory configured to store target location data representative of a target location;
    a position determining component configured to generate a position signal representative of a position of the data processing apparatus;
    an orientation determining component configured to generate an orientation signal representative of an orientation of the data processing apparatus;
    a haptic transducer within a mobile device configured to provide directional haptic feedback to a user of the data processing apparatus indicative of a relative direction to the target location from the position, the haptic transducer comprising at least a first haptic device within the mobile device generating vibrations along a first axis, and a second haptic device within the mobile device generating vibrations along a second axis, the vibrations along the first and second axes collectively comprising the directional haptic feedback indicative of the relative direction to the target location; and
    a processor configured to process the target location data, position signal and orientation signal in order to generate a transducer control signal that is configured to actuate the haptic transducer to provide the directional haptic feedback indicative of the relative direction to the target location.

2. The data processing apparatus of claim 1, wherein the processor is configured to generate the transducer control signal periodically.

3. The data processing apparatus of claim 1, wherein the first and second axes are perpendicular to each other.

4. The data processing apparatus of claim 1, wherein the haptic transducer is configured to provide directional haptic feedback signals in three dimensions, and wherein the haptic transducer further comprises a third haptic device within the mobile device generating vibrations along a third axis perpendicular to the first and second axes.

5. The data processing apparatus of claim 1, wherein the processor is further configured to determine if a current relative direction of motion of the data processing apparatus is towards the target location, and to generate a transducer control signal responsive to that determination.

6. The data processing apparatus of claim 1, wherein the data processing apparatus further comprises:
    one or more accelerometers configured to generate acceleration signals representative of the acceleration of the data processing apparatus; and
    wherein the processor is configured to process the acceleration signals to determine the distance and direction traveled by the data processing apparatus after a position signal is generated by the position determining component, and to use the determined distance and direction to generate the transducer control signal.

7. The data processing apparatus of claim 1, wherein the position determining component is configured to receive signals from a plurality of transmitters.

8. The data processing apparatus of claim 7, wherein the position determining component is a global positioning system (GPS).

9. The data processing apparatus of claim 1, wherein the orientation determining component is a gravity sensor.

10. The data processing apparatus of claim 1, wherein the data processing apparatus comprises one of a mobile computing device, a mobile telephone, a personal digital assistant, a personal computer and a laptop.

11. The data processing apparatus of claim 1 comprising a first and second separate physical device, wherein:
    the position determining component and the memory are located within the first physical device; and
    the haptic transducer and the orientation determining component are located within the second physical device.

12. The data processing apparatus of claim 11, wherein the second physical device comprises a wireless receiver configured to receive a signal from the first device that is configured to actuate the haptic transducer to provide the directional haptic feedback.

13. The apparatus of claim 1, wherein each of the first and second haptic devices comprises:
    a weight;
    a base plate at a proximal end of a longitudinal chute;
    a spring attached between the weight and the base plate in the longitudinal chute; and
    an electromagnet at the distal end of the longitudinal chute, wherein the directional vibrations are caused by movement of the weight along the longitudinal chute.

14. The apparatus of claim 13, wherein the transducer control signal controls power to the electromagnet and wherein the weight is drawn toward the electromagnet against the spring when power is applied to the electromagnet, and wherein the spring forces the weight away from the electromagnet when power is removed from the electromagnet.

15. A method of operating a data processing apparatus comprising:
    storing target location data representative of a target location in memory;
    generating a position signal representative of a position of the data processing apparatus;
    generating an orientation signal representative of an orientation of the data processing apparatus;
    processing the target location data, position signal and orientation signal in order to generate a transducer control signal representing a relative direction to the target location from the position; and providing directional haptic feedback to a user of the data processing apparatus indicative of the relative direction to the target location by actuating a haptic transducer within a mobile device responsive to the transducer control signal, the haptic transducer comprising at least a first haptic device within the mobile device generating vibrations along a first axis, and a second haptic device within the mobile device generating vibrations along a second axis, the vibrations along the first and second axes collectively comprising the directional haptic feedback signal indicative of the relative direction to the target location.

16. The method of claim 15, wherein the step of processing further comprises processing to generate the transducer control signal periodically.

17. The method of claim 15, wherein the first and second axes are perpendicular to each other.

18. The method of claim 15, wherein actuating the haptic transducer provides directional haptic feedback signals in three dimensions, and wherein the haptic transducer further comprises a third haptic device within the mobile device generating vibrations along a third axis perpendicular to the first and second axes.

19. The method of claim 15, further comprising:
determining if a current relative direction of motion of the data processing apparatus is towards the target location; and
generating a transducer control signal responsive to that determination.

20. The method of claim 15, further comprising:
generating acceleration signals representative of the acceleration of the data processing apparatus; and
processing the acceleration signals to determine the distance and direction traveled by the data processing apparatus after a position signal is generated by the position determining component, and to use the determined distance and direction to generate the transducer control signal.

* * * * *